US 6,659,413 B2

United States Patent
Koli

(10) Patent No.: US 6,659,413 B2
(45) Date of Patent: Dec. 9, 2003

(54) BRACKET

(75) Inventor: Roni Koli, Ohkola (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/309,314

(22) Filed: Dec. 4, 2002

(65) Prior Publication Data

US 2003/0127576 A1 Jul. 10, 2003

Related U.S. Application Data

(63) Continuation of application No. PCT/FI01/00531, filed on Jun. 5, 2001.

(30) Foreign Application Priority Data

Jun. 6, 2000 (FI) ............................................. 200001354

(51) Int. Cl.$^7$ ................................................. A47F 5/00
(52) U.S. Cl. ................................................. 248/288.31
(58) Field of Search ........................... 248/371, 288.31, 248/289.11, 291.1, 292.14, 181.1, 183.2; 403/52, 53, 59, 60, 66, 78, 79, 80

(56) References Cited

U.S. PATENT DOCUMENTS

| 3,661,376 A | | 5/1972 | Hill et al. |
| 3,854,557 A | * | 12/1974 | Wilcox ................... 188/322.15 |
| 4,372,179 A | * | 2/1983 | Dolenc et al. ............. 74/579 E |
| 4,440,440 A | * | 4/1984 | Juy ........................ 297/215.14 |
| 4,770,382 A | | 9/1988 | Lehti |
| 4,842,059 A | * | 6/1989 | Tomek ....................... 166/65.1 |
| 5,030,103 A | * | 7/1991 | Buist et al. ................. 434/278 |
| 5,094,195 A | * | 3/1992 | Gonzalez .................... 123/56.4 |
| 5,118,058 A | | 6/1992 | Richter |
| 5,247,848 A | * | 9/1993 | Sabel ....................... 74/473.36 |
| 5,404,682 A | * | 4/1995 | West ............................ 52/165 |
| 5,423,722 A | * | 6/1995 | Beauch et al. ............... 464/151 |
| 5,941,912 A | * | 8/1999 | Taylor et al. .................. 623/28 |
| 6,123,300 A | * | 9/2000 | Chen ........................ 248/188.8 |
| 6,244,966 B1 | * | 6/2001 | Ofenhitzer et al. .......... 464/121 |
| 6,347,564 B1 | * | 2/2002 | Ciocca ....................... 81/177.8 |
| 6,347,776 B1 | * | 2/2002 | Chuang .................. 248/288.51 |
| 6,523,441 B2 | * | 2/2003 | Lee .......................... 81/177.85 |

FOREIGN PATENT DOCUMENTS

| DE | 31 48 390 | 6/1983 |
| EP | 0 016 913 | 10/1980 |
| EP | 0 170 055 | 2/1986 |
| FI | 862 892 | 9/1988 |

* cited by examiner

*Primary Examiner*—Leslie A. Braun
*Assistant Examiner*—Kofi Scholterbrandt
(74) *Attorney, Agent, or Firm*—Pillsbury Winthrop LLP

(57) ABSTRACT

The invention relates to a bracket comprising a first bracket part (1) with a first spherical surface (2), a second bracket part (3) with a second spherical surface (4), and a fastening element (5) for fastening the first bracket part (1) movably to the second bracket part (3). The second bracket part (3) comprises a groove (6) or the like, the fastening element (5) is at least partly placed in the groove (6), the first bracket part (1) is movable with respect to the second bracket part (3) so that a relative movement is generated between the fastening element (5) and the groove (6), and the first bracket part (1) is turnable with respect to the second bracket part (3) so that the fastening element (5) simultaneously remains substantially in its place with respect to the groove (6).

1 Claim, 4 Drawing Sheets

Figure 1:
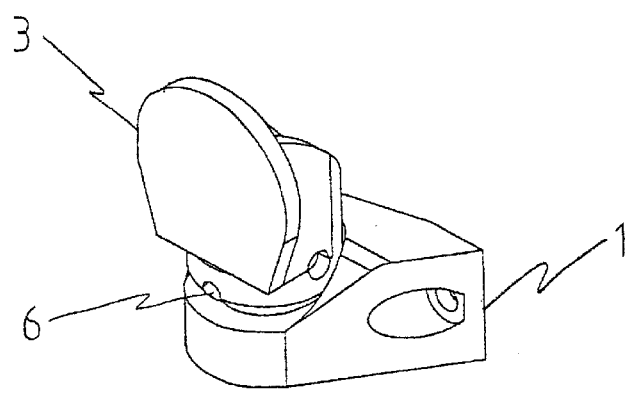

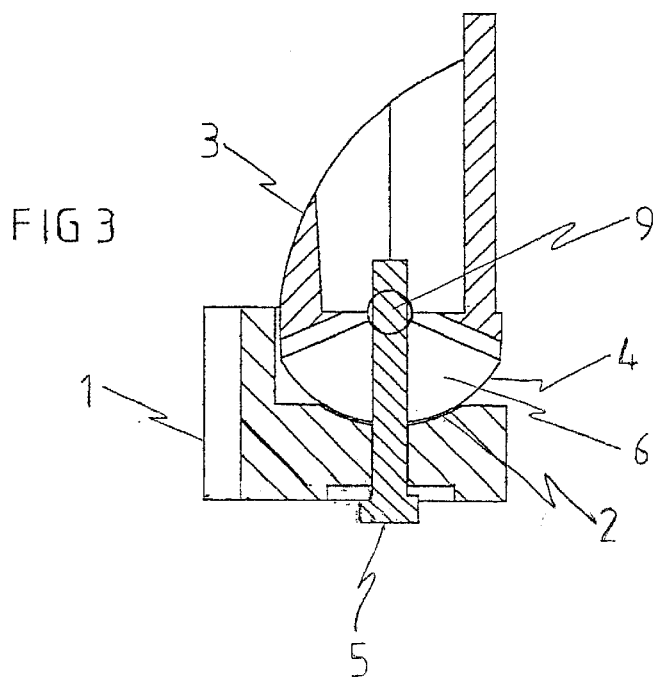
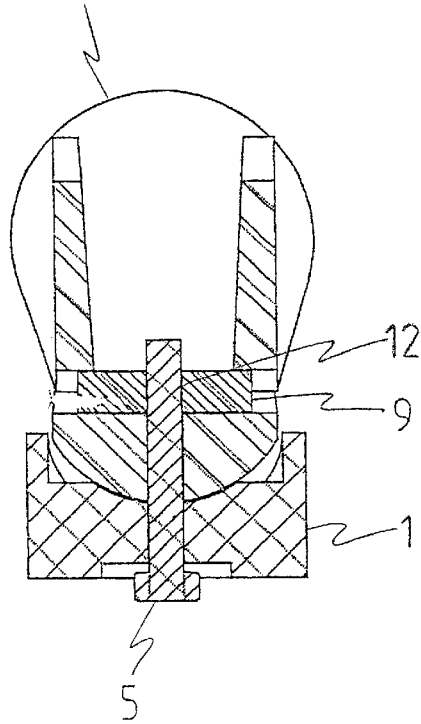
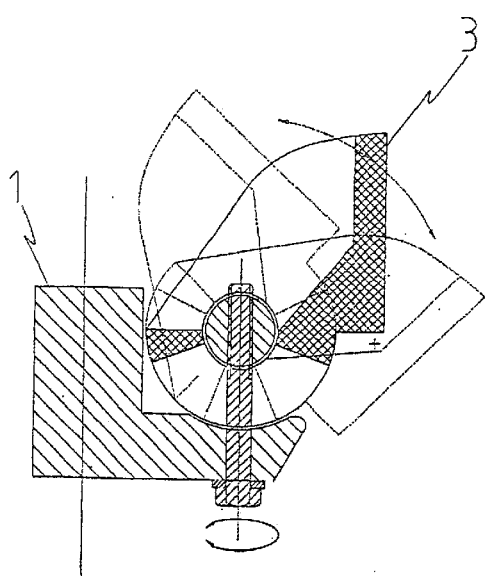

BRACKET

This application is a Continuation of International Application PCT/FI01/00531 filed on Jun. 5, 2001, which designated the U.S. and was published under PCT Article 21(2) in English.

BACKGROUND OF THE INVENTION

The invention relates to a bracket comprising a first bracket part with a first spherical surface, a second bracket part with a second spherical surface, and a fastening element for fastening the first bracket part movably to the second bracket part so that the first spherical surface and the second spherical surface are arranged to operate together.

Such brackets are used in mechanisms for fastening and directing radio link devices, for instance, and in entertainment electronics, such as in camera positioners. However, the bracket of the invention can also be used in applications other than what are mentioned above.

A number of brackets according to the preamble of claim 1 are previously known.

A problem with these known arrangements is that it is cumbersome to fasten the first bracket part with respect to the second bracket part, because the bracket parts move with respect to one another simultaneously in various directions.

U.S. Pat. Nos. 3,661,376 and 5,118,058 disclose brackets, where one bracket part of the bracket comprises a groove in which a second bracket part of the bracket can be moved. These known brackets do not, however, comprise bracket parts that would have such spherical surfaces that are arranged to operate together. Therefore, the technical basic structure of these known brackets differs from the bracket according to the application.

BRIEF DESCRIPTION OF THE INVENTION

The invention thus relates to a bracket which solves the above mentioned problem.

The object of the invention is achieved by a bracket, which is characterized by what is stated in the independent claims.

The preferred embodiments of the invention are disclosed in the dependent claims.

What is essential is the groove in the second bracket part, by which, on the one hand, the first bracket part is prevented from moving with respect to the second bracket part when the first bracket part is turned with respect to the second bracket part. The groove, on the other hand, allows the first bracket part to be moved with respect to the second bracket part so that the first bracket part does not simultaneously turn with respect to the second bracket part.

Since, owing to the structure of the bracket of the invention, the movements between the first bracket part and the second bracket part are divided into components, it is more accurate and easier to direct, for example, a radio link device which is fastened with it.

In addition, the bracket according to the invention can be constructed such that only one fastening element needs to be tightened after the directing. This makes it extremely simple to fasten and direct devices by means of the bracket of the invention.

For example, the bracket can be used or it can be fastened such that the groove in the second bracket part allows vertical and horizontal directing, and the horizontal directing is carried out by turning the first bracket part with respect to the second bracket part.

The bracket of the invention has about half as many parts as corresponding, current brackets. This is a considerable economical saving, because brackets become cheaper.

LIST OF FIGURES

Figure 2:
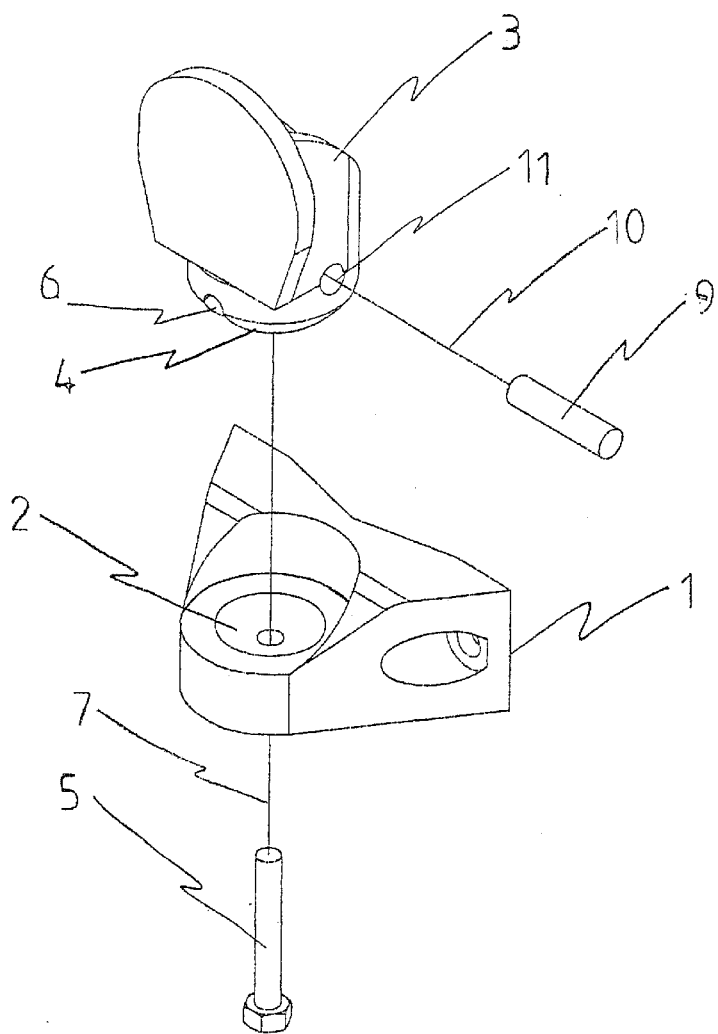
Figure 6:
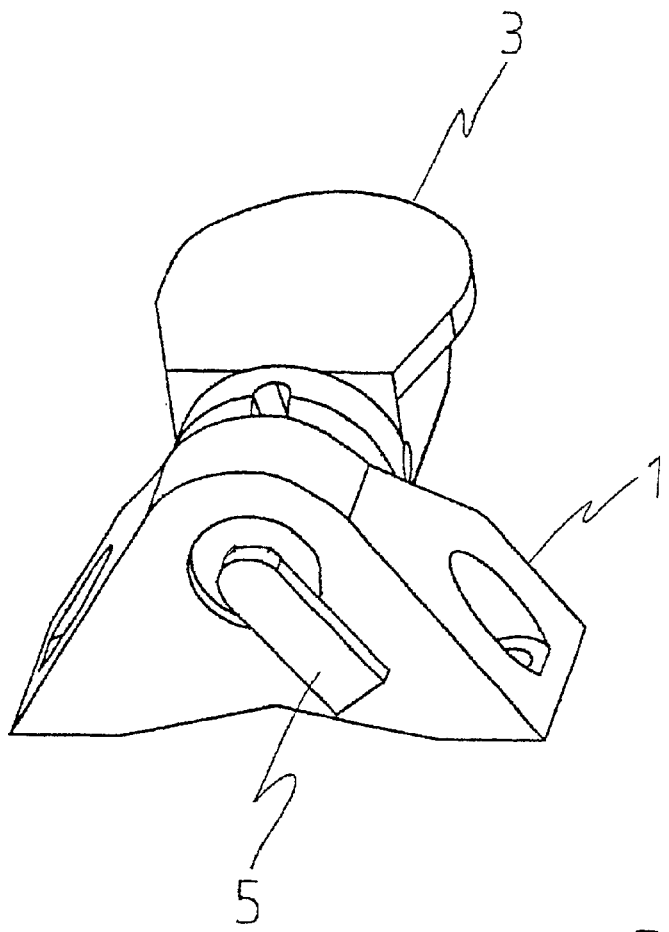
Figure 7:
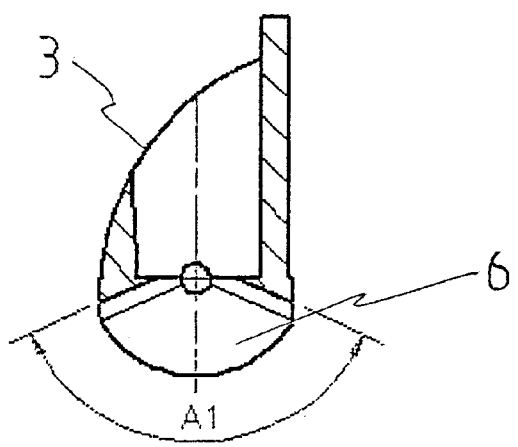
Figure 8:
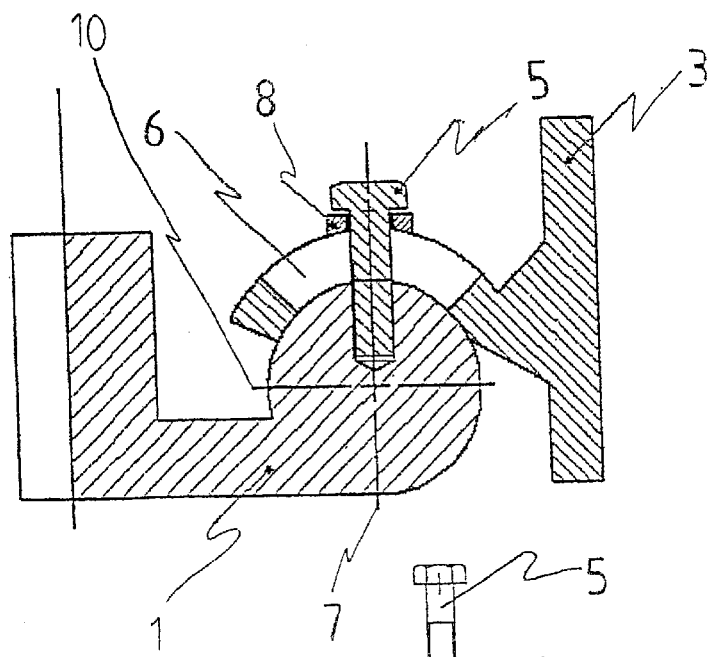
Figure 9:
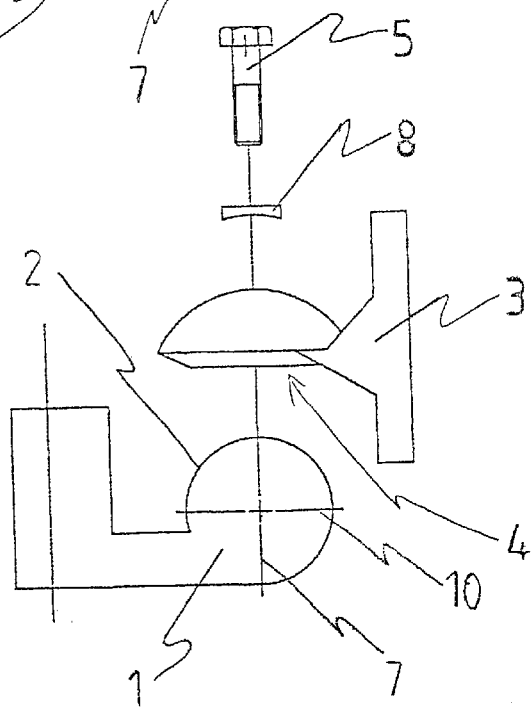
Figure 10:
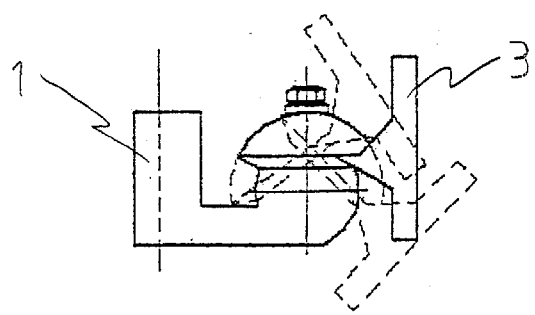

In the following the invention will be described in greater detail in connection with the preferred embodiments, with reference to the attached drawings, in which FIG. 1 shows a first embodiment of a bracket, FIG. 2 shows an exploded view of the bracket according to FIG. 1, FIG. 3 shows the bracket according to FIG. 1 in section along the fastening element, FIG. 4 shows the bracket according to FIG. 1 in section along the shaft, FIG. 5 illustrates the operation of the bracket according to FIGS. 1 to 4, FIG. 6 shows a first embodiment of the bracket, where the fastening element comprises a quick-locking function, FIG. 7 shows a second bracket part in section, FIG. 8 shows a second embodiment of the bracket according to the invention in section, FIG. 9 shows an exploded view of the bracket according to FIG. 8, and FIG. 10 illustrates the operation of the bracket according to FIG. 8.

DETAILED DESCRIPTION OF THE INVENTION

The figures show a bracket comprising a first bracket part 1 with a first spherical surface 2 and a second bracket part 3 with a second spherical surface 4.

The first bracket part 1 comprises first fastening elements (not marked with a reference number) and the second bracket part 3 comprises second fastening elements (not marked with a reference number). In the brackets according to the figures, the first fastening elements of the first bracket part 1 are intended for fastening the bracket to a support, such as a wall or a pole. In the brackets according to the figures, the second fastening elements of the second bracket part 3 are intended for fastening a part to be fastened with the bracket of the invention to the actual bracket.

The bracket also comprises a fastening element 5 for fastening the first bracket part 1 movably to the second bracket part 3 so that the first spherical surface 2 and the second spherical surface 4 are arranged to operate together.

The central point (not marked with a reference number) of the first spherical surface 2 is preferably substantially in the same location as the central point (not marked with a reference number) of the second spherical surface 4. Such a solution allows the first bracket part 1 to be positioned more accurately with respect to the second bracket part 2.

The second bracket part 3 comprises a groove 6 or the like. The fastening element 5 is placed at least partly in the groove 6. The figures show brackets in which the fastening element 5 extends through the groove 6.

On the one hand, the first bracket part 1 can be moved with respect to the second bracket part 3 so that a relative movement is generated between the fastening element 5 and the groove 6. On the other hand, the first bracket part 1 can be turned with respect to the second bracket part 3 so that the fastening element 5 remains substantially in its place with respect to the groove 6. This means that the fastening element 5 can, however, turn in the groove 6, as, for instance, in the embodiment according to FIGS. 1 to 7, because the fastening element 5 is fastened to the second bracket part 3.

In the embodiment of FIGS. 8 to 10, the groove 6 is an elongated, curved opening in the second bracket part 3.

In the embodiments according to the figures, the fastening element 5 is a bolt comprising a first central axis 7. The fastening element 5 may preferably also be a screw or a similar type of fastening means. In the brackets according to the figures, the first central axis 7 of the bolt (FIGS. 1 to 7) or an imaginary extension thereof (FIGS. 8 to 10) substantially extends through the central point common to the first spherical surface 2 and the second spherical surface 4. The second bracket part 3 can thus be turned around the first central axis 7 of the fastening element 5.

The first bracket part 1 can preferably be locked by means of the fastening element 5 substantially so that it cannot move with respect to the second bracket part 3. Such brackets are illustrated in the figures. Alternatively, the bracket can comprise a second locking arrangement for locking the first bracket part 1 with respect to the second bracket part 3. The bracket may, for instance, comprise a locking arrangement in the form of a screw (not shown), extending through a threaded hole (not shown) in the first bracket part or the second bracket part and pressing against the first bracket part or the second bracket part so that the first bracket part and the second bracket part interlock with one another.

The bracket may comprise a spring element (not shown) which is arranged to prevent the first bracket part 1 from moving with respect to the second bracket part 3.

In the embodiment according to FIGS. 1 to 7, the bolt is provided with a washer 8, the shape of which at least partly corresponds to the shape of the first bracket part 1. In FIGS. 1 to 7, the washer 8 is also placed in a recess (not marked with a reference number) in the first bracket part 1.

In the embodiment according to FIGS. 8 to 10, the bolt is provided with a washer 8, the shape of which at least partly corresponds to the shape of the second bracket part 3.

In the embodiment according to FIGS. 1 to 7, the second bracket part 3 also comprises a shaft 9 with a second central axis 10. In FIGS. 1 to 7, the second central axis 10 preferably extends substantially through the central point common to the first spherical surface 2 and the second spherical surface 4. The first central axis 7 and the second central axis 10 intersect substantially at a right angle at the central point (not marked with a reference number) common to the first spherical surface 2 and the second spherical surface 4.

The fastening element 5 is fastened to the shaft 9. Thus, the shaft 9 is made to be located at the central point common to the first spherical surface 2 and the second spherical surface 4 and to remain there. In this way, the first bracket part 1 is also fastened to the second bracket part 3.

In FIGS. 1 to 7, the shaft 9 is in a cylindrical opening 11 in the second bracket part 3, the dimensions and shape of the opening preferably corresponding to the dimensions and shape of the shaft 9. To increase friction, the shaft 9 is preferably knurled so that the shaft 9 would remain easier in its place in the opening. By applying this solution, the first bracket part 1 maintains its position with respect to the second bracket part 3 better.

The shaft 9 preferably comprises a hole 12. The hole 12 is preferably provided with threads (not marked with a reference number) for the fastening element 5.

The first spherical surface 2 is preferably at least partly roughened (not marked with a reference number). The second spherical surface 4 is preferably at least partly roughened (not marked with a reference number). The roughening creates friction between the first spherical surface 2 and the second spherical surface 4.

The bracket of FIGS. 1 to 7 has the following operational principle:

The directing is based on the first spherical surface 2 and the second spherical surface 4, and on the first axis and the second axis. In the figure, the first axis is a vertical axis and is composed of the first central axis 7 of the fastening element 5, i.e. the bolt, and the second axis is a horizontal axis and is composed of the second central axis 10 of the shaft 9. The first central axis 7 of the vertical axis and the second axis of the horizontal axis intersect substantially at a right angle substantially at the central point common to the first spherical surface 2 and the second spherical surface 4. The horizontal directing is thus carried out by means of the vertical axis by turning the second bracket part 3 around the vertical axis. The vertical directing is carried out by turning the second bracket part 3 around the horizontal axis so that a relative movement is generated between the fastening element 5 and the groove 6. The first bracket part 1 is tightened and locked with respect to the second bracket part 3 by means of the fastening element 5.

For the operation of the bracket according to FIGS. 1 to 7, substantial parts in the second bracket part 3 thus include the second spherical surface 4 and the shaft 9, the second central axis 10 of which extends through the central point of the second spherical surface 4, and the groove 6 for the fastening element 5 (bolt), which is also located at the central point of the second spherical surface 4. The width of the groove 6, which is denoted by measure A1 in FIG. 7, defines the range of adjustment for the vertical adjustment, i.e. how many degrees the adjustment can be in an upward or downward direction.

In the first bracket part 1, parts substantial for the operation include the first spherical surface 2 and the fastening element 5, the first central axis 7 of which extends through the central point of the first spherical surface 2.

The second bracket part 3 turns around the first central axis 7 of the fastening element 5 and slides in the first spherical surface 2, i.e. "cup", of the first bracket part 1 and thus allows the vertical directing. The friction between the first spherical surface 2 and the second spherical surface 4 locks the directing in the vertical direction. This is carried out by means of the fastening element 5 and the shaft 9 by tightening the fastening element 5, whereby the shaft 9 closes the horizontal and vertical adjustment, which means that the gap between the upper ball joints of the first bracket part 1 and the second bracket part 3 and the gap between the second bracket part 3 and the shaft 9 are sealed.

FIGS. 8 to 10 show a second embodiment of the bracket according to the invention, where the operational principle is the same as in the bracket of FIGS. 1 to 7, but the groove 6, which is important for the operation, is in the upper ball joint in the figures.

As shown in FIG. 10, the second bracket part 3 can move with respect to the first bracket part 1 so that the fastening element 5 moves with respect to the elongated groove 6 between the ends (not marked with a reference number) of the groove 6.

It is obvious to a person skilled in the art that as technology advances, the basic idea of the invention can be implemented in a variety of ways. The invention and the embodiments thereof are thus not restricted to the above examples, but may be modified within the scope of the claims.

What is claimed is:

1. A bracket comprising
    a first bracket part with a first spherical surface,
    a second bracket part with a second spherical surface and which comprises a shaft with a second central axis, and
    a fastening element having a first central axis and which is fastened to the shaft so that the first bracket part is movably fastened to the second bracket part so that the first spherical surface and the second spherical surface are arranged to operate together,
    wherein the second bracket part comprises a groove, the fastening element is at least partially placed in the groove, the first bracket part is turnable with respect to the second bracket part around the second central axis of the shaft so that a relative movement is generated between the fastening element and the groove, the first bracket part is turnable with respect to the second bracket part around the first central axis of the fastening element so that the fastening element simultaneously remains substantially in place with respect to the groove, the first central axis and the second central axis intersect substantially at a right angle in a common central point of the first spherical surface and the second spherical surface, the shaft comprises a hole for the fastening element, and the hole is provided with threads for fastening the fastening element by screwing it to the shaft.

* * * * *

UNITED STATES PATENT AND TRADEMARK OFFICE
CERTIFICATE OF CORRECTION

PATENT NO.    : 6,659,413 B2
DATED         : December 9, 2003
INVENTOR(S)   : Roni Koli It is certified that error appears in the above-identified patent and that said Letters Patent is hereby corrected as shown below:

<u>Title page,</u>
Item [30], Foreign Application Priority Data, should read
-- June 6, 2000         (FI) ………………………… 20001354 --

Signed and Sealed this

Eighteenth Day of May, 2004

JON W. DUDAS
*Acting Director of the United States Patent and Trademark Office*